(12) United States Patent
Gyoten

(10) Patent No.: US 6,753,923 B2
(45) Date of Patent: Jun. 22, 2004

(54) VIDEO PROJECTING SYSTEM

(75) Inventor: Takaaki Gyoten, Kobe (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 428 days.

(21) Appl. No.: 09/940,633

(22) Filed: Aug. 29, 2001

(65) Prior Publication Data

US 2002/0024612 A1 Feb. 28, 2002

(30) Foreign Application Priority Data

Aug. 30, 2000 (JP) ........................................ 2000-261619

(51) Int. Cl.[7] .............................................. H04N 5/262
(52) U.S. Cl. ..................................... 348/383; 348/745
(58) Field of Search ................................. 348/383, 744, 348/745, 38, 750, 778, 830, 840; H04N 5/262

(56) References Cited

U.S. PATENT DOCUMENTS

| | | | | |
|---|---|---|---|---|
| 5,166,801 A | * | 11/1992 | Yoshikawa | 348/383 |
| 5,734,446 A | * | 3/1998 | Tokoro et al. | 348/745 |
| 6,222,593 B1 | * | 4/2001 | Higurashi et al. | 348/745 |
| 6,456,339 B1 | * | 9/2002 | Surati et al. | 348/745 |
| 6,545,685 B1 | * | 4/2003 | Dorbie | 345/582 |

FOREIGN PATENT DOCUMENTS

| | | |
|---|---|---|
| EP | 0 473 820 | 3/1992 |
| EP | 0 739 133 | 10/1996 |
| JP | 8-304753 | 11/1996 |
| WO | 99/31877 | 6/1999 |

OTHER PUBLICATIONS

Patent Abstracts of Japan vol. 017, No. 535 (E–1439), Sep. 27, 1993 & JP 05 151917 A, Jun. 18, 1993.
Patent Abstracts of Japan vol. 007, No. 236 (E–205), Oct. 20, 1983 & JP 58 125986 A, Jul. 27, 1983.
Patent Abstracts of Japan vol. 1999, No. 09, Jul 30, 1999 & JP 11 098439 A, Apr. 9, 1999.
Patent Abstracts of Japan vol. 1996, No. 01, Jan. 31, 1996 & JP 07 239504 A, Sep. 12, 1995.

* cited by examiner

*Primary Examiner*—Michael H. Lee
(74) *Attorney, Agent, or Firm*—Wenderoth, Lind & Ponack, L.L.P.

(57) ABSTRACT

A video projecting system includes two video projectors. Each video projector has a scaling processing circuit that generates a scaled video signal from an incoming video signal, the scaled video signal representing a partial image of a predetermined size, a luminance adjustment circuit that generates from the scaled video signal from the scaling processing circuit an adjusted video signal representing the partial image having a reduced luminance in a predetermined region of the partial image, and a display device that generates a partial image based on the adjusted video signal which is outputted from the luminance adjustment circuit. The partial image generated by the display device is projected via an optical system onto a screen, so that respective partial images partially overlap each other, thereby creating one stitched image. Thus, a compact and inexpensive video projecting system which can eliminate the need of manual readjustment of a plurality of video projectors is provided.

10 Claims, 12 Drawing Sheets

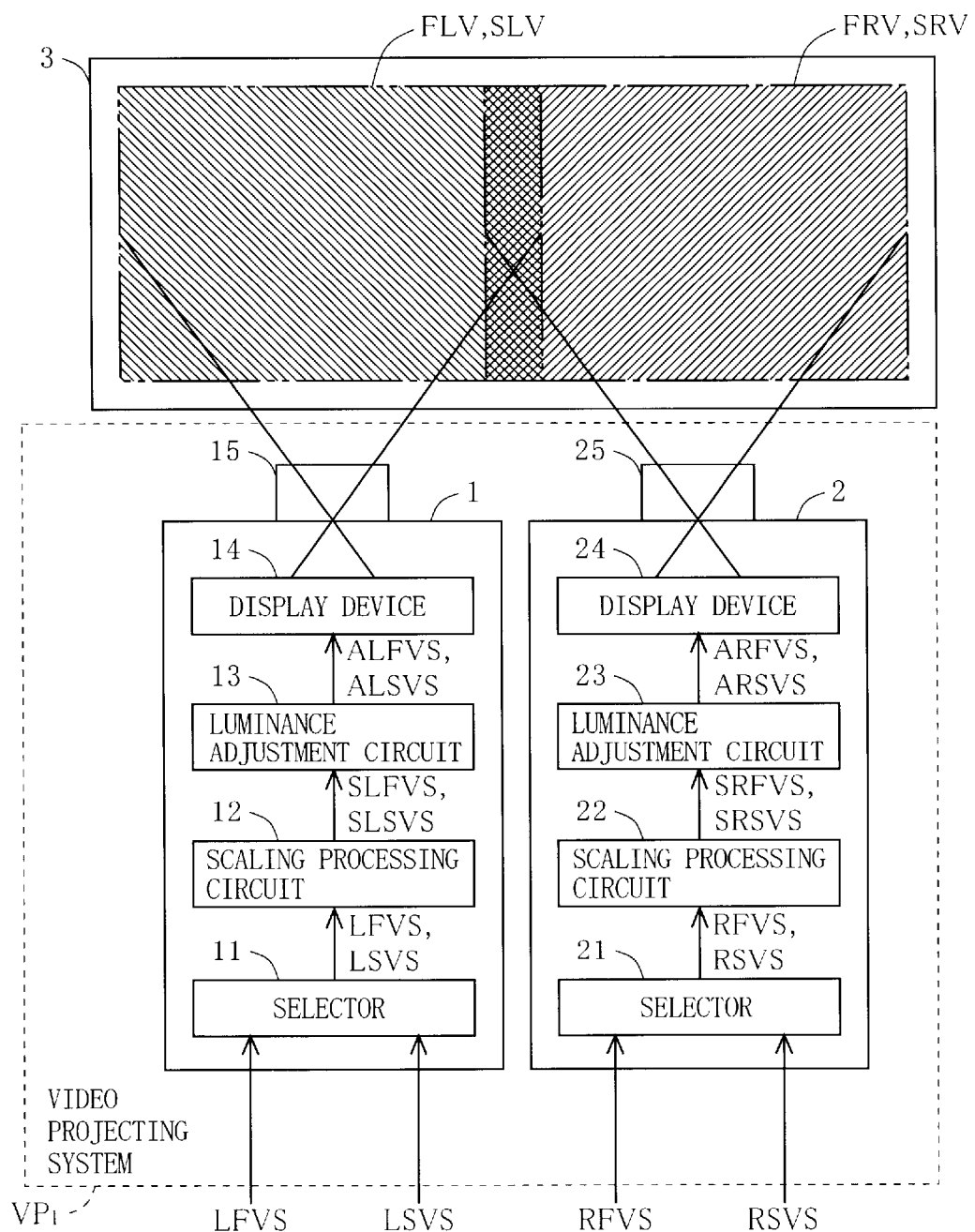
F I G. 1

VIDEO PROJECTING SYSTEM

BACKGROUND OF THE INVENTION

1. Field of the Invention

The present invention relates to video projecting systems, and more particularly to video projecting systems for projecting an image which is generated from a video signal.

2. Description of the Background Art

There is a class of video projecting systems which project on a screen a number of partial images that are generated from a plurality of video projectors, so that a single stitched image is obtained on the screen. As shown in FIG. 12, a video projecting system of this kind typically includes video projectors 121 and 122 which are disposed side by side along the horizontal direction.

The video projector 121 includes a selector 1211, a scaling processing circuit 1212, a display device 1213, and an optical system 1214. The video projector 122 includes a selector 1221, a scaling processing circuit 1222, a display device 1223, and an optical system 1224.

Each of the selectors 1211 and 1221 includes a number of terminals (not shown). In the exemplary structure shown in FIG. 12, a first luminance adjustment circuit 123 and a third luminance adjustment circuit 125 are coupled to the respective terminals of the selector 1211. A second luminance adjustment circuit 124 and a fourth luminance adjustment circuit 126 are coupled to the respective terminals of the selector 1221.

Each of the scaling processing circuits 1212 and 1222 performs a scaling process as described below.

The display device 1213 includes on its display surface a number of pixels as specified by a given standard. The display devices 1213 and 1223 are usually produced so as to conform to the same standard or specifications.

The optical systems 1214 and 1224, each of which may be composed of a number of lenses, are disposed at a distance from the respective display surfaces of the display devices 1213 and 1223.

A screen 127 is disposed externally to the video projecting system, at a position away from the optical systems 1214 and 1224.

Now, an operation of the video projecting system will be described. First, a first video signal LFVS for the left-hand side and a first video signal RFVS for the right-hand side are supplied to the first luminance adjustment circuit 123 and the second luminance adjustment circuit 124, respectively. The first video signals LFVS and RFVS are generated from a first video signal FVS which represents a first image FV to be displayed.

The first video signal LFVS represents a first left partial image FLV, which defines a left-hand portion of the first image FV. The first video signal RFVS represents a first right partial image FRV, which defines a right-hand portion of the first image FV. When projecting the first image FV on the screen 127, the first left partial image FLV and the first right partial image FRV are employed in such a manner that the right vertical edge of first left partial image FLV and the left vertical edge of first right partial image FRV overlap each other, thereby obscuring the junction between the two partial images FLV and FRV.

The first video signal LFVS is received by the first luminance adjustment circuit 123. The first luminance adjustment circuit 123 attenuates a portion of the received first video signal LFVS, i.e., lowers the luminance of the overlapping region of the first left partial image FLV. It should be noted that the luminance of the non-overlapping region of the first left partial image FLV is not lowered. Thus, the first luminance adjustment circuit 123 transfers the processed first video signal LFVS to the selector 1211 as a first adjusted video signal ALFVS.

The second video signal RFVS is received by the second luminance adjustment circuit 124. The second luminance adjustment circuit 124 attenuates a portion of the received second video signal RFVS, i.e., lowers the luminance of only the overlapping region of the first right partial image FRV. The second luminance adjustment circuit 124 transfers the processed first video signal RFVS to the selector 1221 as the first adjusted video signal ARFVS.

The selector 1211 selects either the first luminance adjustment circuit 123 or the third luminance adjustment circuit 125. Assuming that the first luminance adjustment circuit 123 is being selected by the selector 1211, the first adjusted video signal ALFVS is passed through to the scaling processing circuit 1212.

The selector 1221 selects either the second luminance adjustment circuit 124 or the fourth luminance adjustment circuit 126. Note that when the first luminance adjustment circuit 123 is being selected by the selector 1211, the selector 1221 selects the second luminance adjustment circuit 124. In this case, the first adjusted video signal ALFVS is passed through to the scaling processing circuit 1222.

The scaling processing circuit 1212 applies a scaling process to the incoming first adjusted video signal ALFVS. The scaling process is performed because the first adjusted video signal ALFVS may not necessarily be of a signal format which conforms to the standard under which the display device 1213 is enabled to perform a display function. Accordingly, the scaling process is performed in order to convert the first adjusted video signal ALFVS so as to have a signal format which is displayable by the display device 1213. Typically, the original size (or the number of pixels contained) of the first left partial image FLV is converted to a size (or a number of pixels) which can be suitably displayed by the display device 1213. The first adjusted video signal ALFVS having been subjected to the scaling process is outputted to the display device 1213 as a first scaled video signal SLFVS.

The scaling processing circuit 1222 applies a scaling process (which is similar to that performed by the scaling processing circuit 1212) to the adjusted video signal ARFVS outputted from the selector 1221 so as to generate a first scaled video signal SRFVS to be displayed by the display device 1223, which is outputted to the display device 1223.

In accordance with the incoming first scaled video signal SLFVS, the display device 1213 generates the first left partial image FLV on the display surface. The generated first left partial image FLV is projected onto the screen 107 via the optical system 1214.

Similarly, in accordance with the incoming first scaled video signal SRFVS, the display device 1223 generates the first right partial image FRV. The generated first right partial image FRV is projected onto the screen 107 via the optical system 1224.

As a result of the aforementioned processes, the first left partial image FLV and the first right partial image FRV are projected on the screen 107 with a partial overlap therebetween. Thus, a viewer will perceive the first image FV, typically in an "landscape" shape, i.e., with greater horizontal length than vertical height. Furthermore, since the first luminance adjustment circuit 123 and the second luminance adjustment circuit 124 function to lower the luminance of the respective overlapping regions of the first left partial image FLV and the first right partial image FRV in the aforementioned manner, the overlapping region in the first image FV does not appear excessively bright as compared to the other regions. Thus, the conventional video projecting system displays the first image FV in a manner which appears substantially natural to the viewer despite the use of right and left partial images.

On the other hand, in the case where the video projecting system is employed to process a second video signal SVS which is of a signal format different from that of the first video signal FVS, and project a second image SV, the following sequence of processes is performed.

First, a second video signal LSVS for the left-hand side and a second video signal RSVS for the right-hand side, which are generated from the second video signal SVS representing the second image SV, are supplied to the third luminance adjustment circuit 125 and the fourth luminance adjustment circuit 126, respectively.

The third luminance adjustment circuit 125 attenuates some components of the received second video signal LSVS, i.e., lowers the luminance of only an overlapping region of the second left partial image SLV which the second video signal LSVS represents. The fourth luminance adjustment circuit 126 attenuates some components of the received second video signal RSVS, i.e., lowers the luminance of only an overlapping region of the second right partial image SRV which the second video signal RSVS represents.

The second video signals LSVS and RSVS having received the aforementioned processing are then transferred to the selectors 1211 and 1221 as second adjusted video signals ALSVS and ARSVS, respectively. The processes which are performed by the circuitry following the selectors 1211 and 1221 are similar to those described above with respect to the first image FV, and the descriptions thereof are omitted.

However, in accordance with the aforementioned conventional video projecting system, a corresponding number of luminance adjustment circuits are required for any number of signal formats used. Thus, there is a problem in that the overall system may experience a substantial increase in size, which in turn results in an increase in the cost required for constructing such a system.

Moreover, the use of the first video signal FVS and the second video signal SVS also invites the following problem in the aforementioned conventional system. Since the first video signal FVS and the second video signal SVS are of different signal formats, the width of the overlapping region between the first left partial image FLV and the first right partial image FRV may be slightly different from that between the second left partial image SLV and the second right partial image SRV. As a result, a viewer who wishes to view the first image FV and the second image SV one after the other, for example, may have to manually readjust the relative positions of the video projectors 121 and 102.

SUMMARY OF THE INVENTION

Therefore, an object of the present invention is to provide a compact and inexpensive video projecting system which can eliminate the need of the aforementioned manual readjustment.

In order to attain the aforementioned object, a first aspect of the present invention is directed to a video projecting system for generating a stitched image from partial images which are projected by a plurality of video projectors. Each of the plurality of video projectors comprises: a scaling processing circuit for applying a scaling process to an incoming video signal to generate a scaled video signal representing a partial image of a predetermined size; a luminance adjustment circuit for applying a luminance adjustment process to the scaled video signal which is outputted from the scaling processing circuit to generate an adjusted video signal representing the partial image having a reduced luminance in a predetermined region of the partial image; a display device for generating the partial image based on the adjusted video signal which is outputted from the luminance adjustment circuit; and an optical system for projecting the partial image generated by the display device. The partial images projected by the respective optical systems partially overlap each other so as to create the stitched image. The predetermined region is a region in which the respective partial images do overlap each other.

This and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating an overall structure of a video projecting system $VP_1$ according to a first embodiment of the present invention;

DESCRIPTION OF THE PREFERRED EMBODIMENTS

Figure 2:
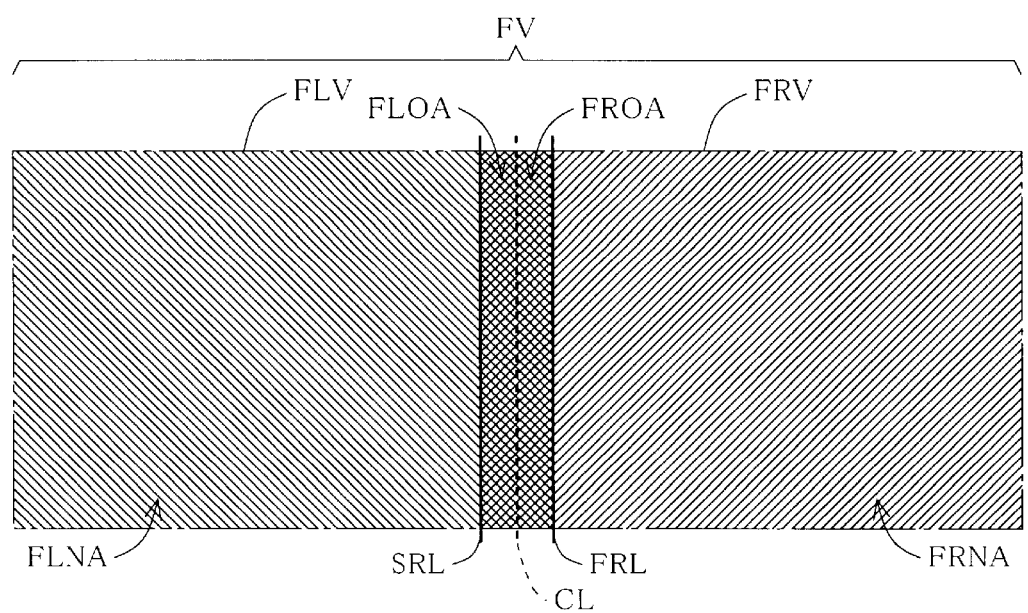
FIG. 2 is a schematic diagram illustrating a first image FV which is generated by the video projecting system $VP_1$ shown in FIG. 1.

FIG. 1 is a block diagram illustrating an overall structure of a video projecting system $VP_1$ according to a first embodiment of the present invention. In FIG. 1, the video projecting system $VP_1$ includes two video projectors 1 and 2 which are disposed side by side along the horizontal direction.

The video projector 1 includes a selector 11, a scaling processing circuit 12, a luminance adjustment circuit 13, a display device 14, and an optical system 15. The video projector 2 includes a selector 21, a scaling processing circuit 22, a luminance adjustment circuit 23, a display device 24, and an optical system 25.

Each of the selectors 11 and 21 includes a number of input terminals (not shown). Each of the scaling processing circuits 12 and 22 performs a scaling process as described below. Each of the luminance adjustment circuits 13 and 23 performs a luminance adjustment process as described below. Each of the display devices 14 and 24 supports a given standard(s), and includes a number of pixels on its display surface. Examples of the standard which may be used for the display devices 14 and 24 are NTSC (National Television System Committee), Hi-Vision (a Japanese HDTV format), XGA, SXGA, and UXGA, among others.

The optical systems 15 and 25, each of which may be composed of a number of lenses, are disposed at a distance from the respective display surfaces of the display devices 14 and 24. A screen 3 may be disposed externally to the video projectors 1 and 2, at a position away from the optical systems 15 and 25.

The video projecting system $VP_1$ having the aforementioned structure receives first video signals LFVS and RFVS, which are generated based on a first image FV.

Referring to FIG. 2, a first reference line FRL is shown which is equivalent to a center line CL of the first image FV having been translated by a predetermined amount to the right. The center line CL, shown with a dotted line in FIG. 2, is a line which perpendicularly splits each of upper and lower horizontal sides of the rectangular-shaped first image FV into halves. A portion of the first image FV which is located on the left of the first reference line FRL (shown with hatched lines descending toward the right) is referred to as a "first left partial image FLV". A "first video signal LFVS", used to represent the first left partial image FLV, includes the luminance component and the chromatic components associated with the pixels contained in the first left partial image FLV.

With continued reference to FIG. 2, a second reference line SRL is shown which is equivalent to the center line CL of the first image FV having been translated by a predetermined amount to the left. A portion of the first image FV which is located on the right of the second reference line SRL (shown with hatched lines descending toward the left) is referred to as a "first right partial image FRV". A "first video signal RFVS", used to represent the first right partial image FRV, includes the luminance component and the chromatic components associated with the pixels contained in the first right partial image FRV.

As will be understood from the above, in order to properly project the first image FV on the screen 3, it is necessary that the right vertical edge of first left partial image FLV and the left vertical edge of first right partial image FRV overlap each other with no substantial misalignment therebetween.

As used herein, a region of the first left partial image FLV which overlaps the first right partial image FRV is referred to as a "first left overlapping region FLOA", and the other region as a "first left non-overlapping region FLNA". Similarly, a region of the first right partial image FRV which overlaps the first left partial image FLV is referred to as a "first right overlapping region FROA", and the other region as a "first right non-overlapping region FRNA".

When the first video signals LFVS and RFVS as described above are inputted to the selectors 11 and 21, the selector 11 selects an input terminal which is associated with the first video signal LFVS, so that the incoming first video signal LFVS is passed therethrough to the scaling processing circuit 12. The selector 21 selects an input terminal which is associated with the first video signal RFVS, so that the incoming first video signal RFVS is passed therethrough to the scaling processing circuit 22.

The scaling processing circuit 12 applies a scaling process to the incoming first video signal LFVS so as to convert the size of the first left partial image FLV into a size which is suitable for display by the display device 14. The scaling process produces a first scaled video signal SLFVS. The first scaled video signal SLFVS, which represents the first left partial image FLV to be displayed by the display device 14, includes the luminance components and the chromatic components associated with the pixels contained in the first left partial image FLV. The first scaled video signal SLFVS is outputted from the scaling processing circuit 12 to the luminance adjustment circuit 13.

The scaling processing circuit 22 applies a scaling process to the incoming first video signal RFVS so as to produce a first scaled video signal SRFVS. The first scaled video signal SRFVS, which represents the first right partial image FRV to be displayed by the display device 24, includes the luminance components and the chromatic components associated with the pixels contained in the first right partial image FRV. The first scaled video signal SRFVS is outputted from the scaling processing circuit 22 to the luminance adjustment circuit 23.

The luminance adjustment circuit 13 performs a luminance adjustment process, whereby some luminance components of the incoming first scaled video signal SLFVS are attenuated; that is, the luminance adjustment circuit 13 reduces the luminance levels of the pixels in the first left overlapping region FLOA.

Figure 3:
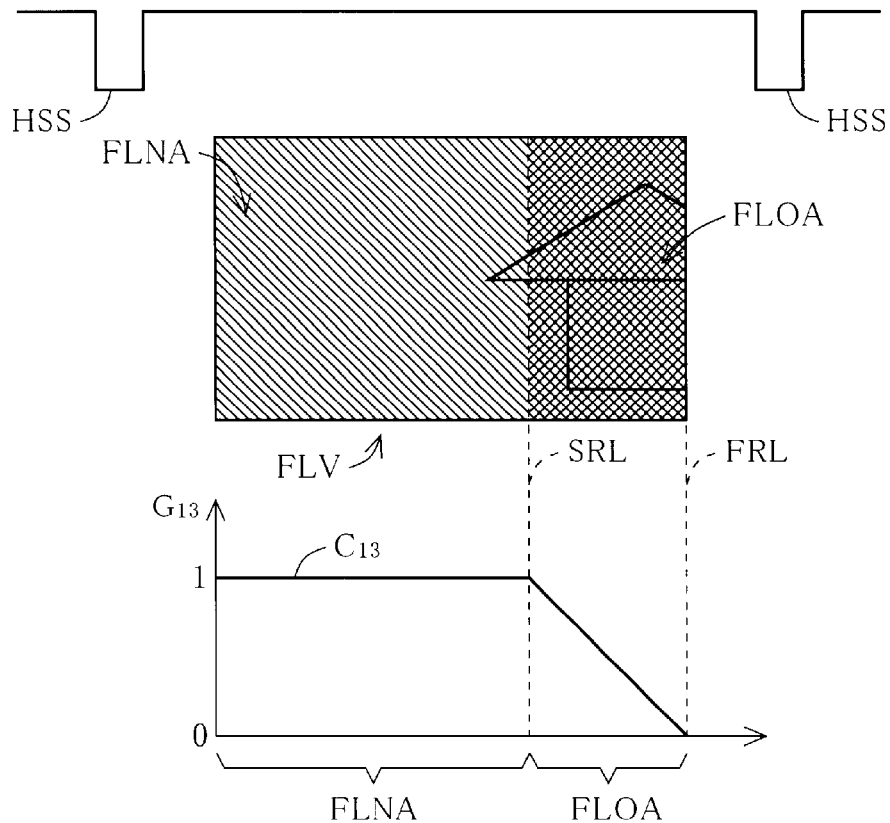
FIG. 3 is a schematic diagram illustrating luminance adjustment processes which are performed by luminance adjustment circuits 13 and 23 shown in FIG. 1.
Figure 3:
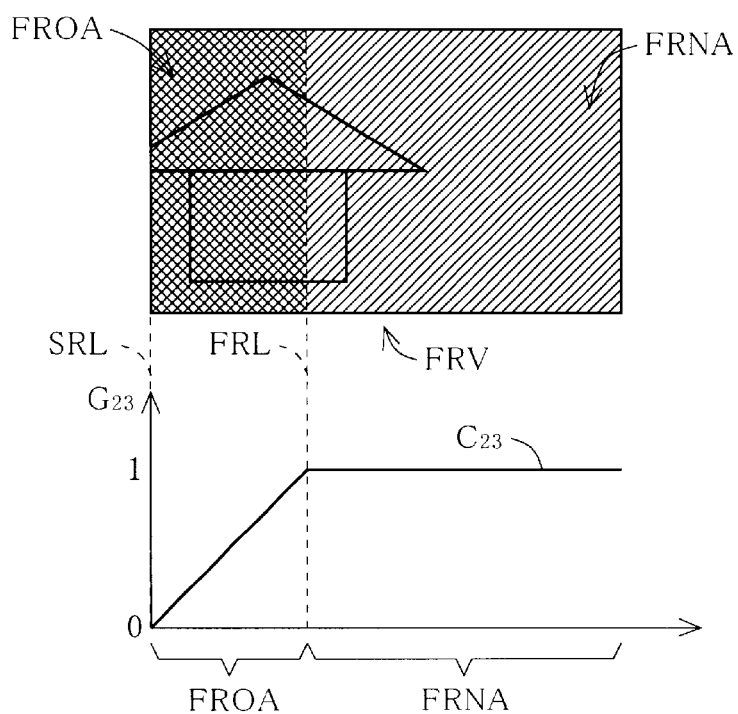

The luminance adjustment process will be described more specifically. As shown in FIG. 3, the first scaled video signal SLFVS contains luminance components and chromatic components associated with one horizontal scanning line in the first left partial image FLV between two contiguous instances of a horizontal synchronization signal HSS.

Also shown in FIG. 3 is a gain characteristics curve $C_{13}$ of the luminance adjustment circuit 13. The gain characteristics curve $C_{13}$ represents levels of gain $G_{13}$ prescribed for the respective pixels in each horizontal scanning line. As shown by the gain characteristics curve $C_{13}$, while the luminance components within the first left non-overlapping region FLNA are being received, the gain $G_{13}$ of the luminance adjustment circuit 13 is set to 1, so that the luminance components are not attenuated, i.e., the luminance adjustment circuit 13 does not reduce the luminance levels of the pixels within the first left non-overlapping region FLNA.

On the other hand, while the luminance components within the first left overlapping region FLOA are being received, the gain $G_{13}$ of the luminance adjustment circuit 13 is set to a value which is equal to or less than 1. More specifically, within the first left overlapping region FLOA, pixels which are closer to the first reference line FRL receive gain values $G_{13}$ which are closer to 0, and pixels which are closer to the second reference line SRL receive gain values $G_{13}$ which are closer to 1, such that the gain values $G_{13}$ vary with a constant slope. By using such values of gain $G_{13}$, the luminance adjustment circuit 13 attenuates the luminance components with in the first left overlapping region FLOA, i.e., reduces the luminance levels of the pixels within the first left overlapping region FLOA.

Having been subjected to the aforementioned luminance adjustment process, the first scaled video signal SLFVS is outputted from the luminance adjustment circuit 13 to the display device 14 as a first adjusted video signal ALFVS.

The luminance adjustment circuit 23 applies a luminance adjustment process to the incoming first scaled video signal SRFVS to generate a first adjusted video signal ARFVS.

The luminance adjustment process will be described more specifically. As shown in FIG. 3, the first scaled video signal SRFVS contains luminance components and chromatic components associated with each horizontal scanning line in the first right partial image FRV.

Also shown in FIG. 3 is a gain characteristics curve $C_{23}$ of the luminance adjustment circuit 23, representing levels of gain $G_{23}$ prescribed for the respective pixels in each horizontal scanning line. As shown by the gain characteristics curve $C_{23}$, while the luminance components within the first right overlapping region FROA are being received, the gain $G_{23}$ of the luminance adjustment circuit 23 is set to a value which is equal to or less than 1.

More specifically, within the first right overlapping region FROA, pixels which are closer to the second reference line SRL receive gain values $G_{23}$ which are closer to 0, and pixels which are closer to the first reference line FRL receive gain values $G_{23}$ which are closer to 1, such that the gain values $G_{23}$ vary with a constant slope. By using such values of gain $G_{23}$, the luminance adjustment circuit 23 attenuates the luminance components within the first right overlapping region FROA, i.e., reduces the luminance levels of the pixels within the first right overlapping region FROA.

On the other hand, while the luminance components within the first right non-overlapping region FRNA are being received, the gain $G_{23}$ of the luminance adjustment circuit 23 is set to 1, so that the luminance components are not attenuated.

Having been subjected to the aforementioned luminance adjustment process, the first scaled video signal SRFVS is outputted from the luminance adjustment circuit 23 to the display device 24 as the first adjusted video signal ARFVS.

The gain characteristics curves $C_{13}$ and $C_{23}$ are prescribed as follows. One or more pixels (hereinafter referred to as "overlapping pixels") that occupy the same position(s) in the first image FV are shared by both the first left overlapping region FLOA and the first right overlapping region FROA. For the sake of illustration, it is assumed that an overlapping pixel in the first left overlapping region FLOA receives a gain $OG_{13}$ and that the same overlapping pixel in the first right overlapping region FROA receives a gain $OG_{23}$. Under this assumption, it is most preferable to satisfy the relationship $OG_{13}+OG_{23}=1$ provided that the gains $G_{13}$ and $G_{23}$, used for the luminance adjustment processes for the left non-overlapping region FLNA and the right non-overlapping region FRNA, respectively, are both set to 1. Stated otherwise, the sum of the gain $G_{13}$ which is applied while the first left overlapping region FROA is being received and the gain $G_{23}$ which is applied while the first right overlapping region FLOA is being received is most preferably "1".

Stated in more general terms, provided that the gains $G_{13}$ and $G_{23}$ used for the respective luminance adjustment processes for the left non-overlapping region FLNA and the right non-overlapping region FRNA are both set to x (where x is a positive number), it is most preferable that $OG_{13}+OG_{23}=x$.

In accordance with the adjusted video signal ALFVS, the display device 14 generates the first left partial image FLV (shown in FIG. 3) on its display surface. The resultant first left partial image FLV is projected onto the screen 3 via the optical system 15.

In accordance with the adjusted video signal ARFVS, the display device 24 generates the first right partial image FRV (shown in FIG. 3) on its display surface. The resultant first right partial image FRV is projected onto the screen 3 via the optical system 25.

Figure 4:
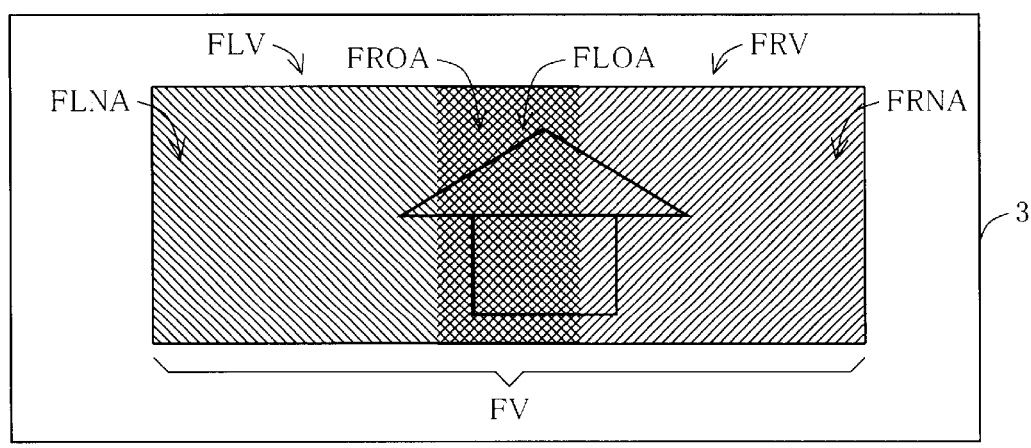
FIG. 4 is a schematic diagram illustrating a specific example of the first image FV to be projected on a screen 3 shown in FIG. 1.

As necessary, the viewer may readjust the relative positions, etc., of the video projectors 1 and 2 so that the first left overlapping region FLOA in the first left partial image FLV and the first right overlapping region FROA in the first right partial image FRV will overlap each other on the screen 3 with no substantial misalignment therebetween. As a result of such readjustment, as shown in FIG. 4., the first image FV having significantly greater horizontal length than vertical height can be projected on the screen 3 without a substantial misalignment in the vertical or horizontal direction.

Note that, where the first left overlapping region FLOA and the first right overlapping region FROA actually overlap each other on the screen 3, a level of luminance is obtained which is equal to the sum of the luminance of the region FLOA and the luminance of the region FROA. However, as a result of the adjustment processes performed by the luminance adjustment circuits 13 and 23, it is ensured that the combined luminance of the region FLOA and the region FROA matches the luminance of the first left non-overlapping region FLNA and the first right non-overlapping region FRNA. Therefore, a viewer can enjoy viewing the first image FV with a substantially uniform brightness throughout the image.

Now, a case will be described where the selectors 11 and 21 in the video projecting system $VP_1$ receive a second video signal LSVS for the left-hand side and a second video signal RSVS for the right-hand side, respectively, as opposed to the first video signals LFVS and RFVS. Herein, it is assumed that the second video signal LSVS and RSVS are generated based on a second left partial image SLV, which defines a left-hand portion of a second image SV, and a second right partial image SRV, which defines a right-hand portion of the second image SV, respectively. The second video signal LSVS and RSVS are generated in a manner similar to the first video signal LFVS and RFVS, except that the second video signals LSVS and RSVS have a different signal format from that of the first video signals LFVS and RFVS.

The selectors 11 and 21 select corresponding input terminals so as to allow the incoming second video signals LSVS and RSVS to be passed therethrough to the scaling processing circuits 12 and 22, respectively.

The scaling processing circuits 12 and 22 apply a scaling process, which is similar to that described above with respect to the first video signals LFVS and RFVS, to the incoming second video signals LSVS and RSVS. Note, however, that the second video signals LSVS and RSVS both have a different signal format from that of the first video signals LFVS and RFVS. For example, the second image SV may comprise a different number of pixels than the first image FV. This may lead to the need to employ a different set of parameters (e.g., scaling ratios and/or display positions) for the scaling process.

As used herein, the "scaling ratio" is a ratio of the number of pixels in the second scaled video signal SLSVS or SRSVS (which are outputted from the scaling circuit 12 or 22, respectively) to the number of pixels in the second video signal LSVS or RSVS (which are inputted to the scaling circuit 12 or 22, respectively). The "display position" defines a pixel region within the display surface of the display device 14 or 24 at which the second left partial image SLV or the second right partial image SRV, respectively, is to be displayed.

The scaling circuit 12 applies a scaling process in accordance with the above parameters to the second video signal LSVS so as to generate the second scaled video signal SLSVS, which represents the second left partial image SLV to be displayed by the display device 14, and outputs the second scaled video signal SLSVS to the luminance adjustment circuit 13. Similarly, the scaling circuit 22 applies a scaling process in accordance with the above parameters to the second video signal RSVS so as to generate the second scaled video signal SRSVS, which represents the second right partial image SRV to be displayed by the display device 24, and outputs the second scaled video signal SRSVS to the luminance adjustment circuit 23.

Thus, the scaled video signals SLFVS and SLSVS which are outputted from the scaling processing circuit 12 have a signal format which is compatible with the display device 14. Similarly, the scaled video signals SRFVS and SRSVS which are outputted from the scaling processing circuit 22 have a signal format which is compatible with the display device 24.

The luminance adjustment circuit 13 is assigned with the gain $G_{13}$ based on the gain characteristics curve $C_{13}$, as in the case of the first scaled video signal SLFVS, and a luminance adjustment process is applied to the second scaled video signal SLSVS accordingly. Thus, the luminance adjustment circuit 13 generates the second adjusted video signal ALSVS, which represents the second left partial image SLV with partially adjusted luminance components, and outputs the second adjusted video signal ALSVS to the display device 14.

Similarly, as in the case of the first scaled video signal SRFVS, the luminance adjustment circuit 23 generates the second adjusted video signal ARSVS, which represents the second right partial image SRV with partially adjusted luminance components, and outputs the second adjusted video signal ARSVS to the display device 24.

The display device 14 displays the second left partial image SLV in accordance with the adjusted video signal ALSVS. The displayed second left partial image SLV is projected onto the screen 3 via the optical system 15.

Similarly, the display device 24 displays the second right partial image SRV in accordance with the adjusted video signal ARSVS. The displayed second right partial image SRV is projected onto the screen 3 via the optical system 25.

As described above, in accordance with the video projecting system $VP_1$, even when a video signal having a different signal format is received by the selectors 11 and 21, video signals having a signal format which is compatible with the display devices 14 and 24 are provided at the output terminals of the scaling processing circuits 12 and 22. As a result, the luminance adjustment circuits 13 and 23 can perform luminance adjustment processes by using the same gain characteristics curves $C_{13}$ and $C_{23}$, respectively, for a number of incoming video signals which may originally have different signal formats.

In other words, in accordance with the inventive structure, in which the luminance adjustment circuits 13 and 23 are provided immediately after the scaling processing circuits 12 and 22, the first left overlapping region FLOA of the first image FV coincides with the left overlapping region (not shown) of the second image SV, and the first right overlapping region FROA of the first image FV also coincides with the right overlapping region (not shown) of the second image SV. Thus, the luminance-reducing processed performed by the luminance adjustment circuits 13 and 23 can be directed to the same region of a number of partial images which may originally be of different formats.

Therefore, a viewer can enjoy viewing the second image SV having significantly greater horizontal length than vertical height, with no substantial misalignment in the vertical or horizontal direction, without having to readjust the positioning, etc., of the video projectors 1 and 2 from the way they were set for viewing the first image FV. In other words, in accordance with the video projecting system $VP_1$, once an accurate positioning of the video projectors 1 and 2 is attained, there is substantially no need to readjust the positioning of the video projectors 1 and 2 later when an image having a different signal format is to be reproduced. As a result, the video projecting system $VP_1$ can be operated with less trouble.

Figure 12:
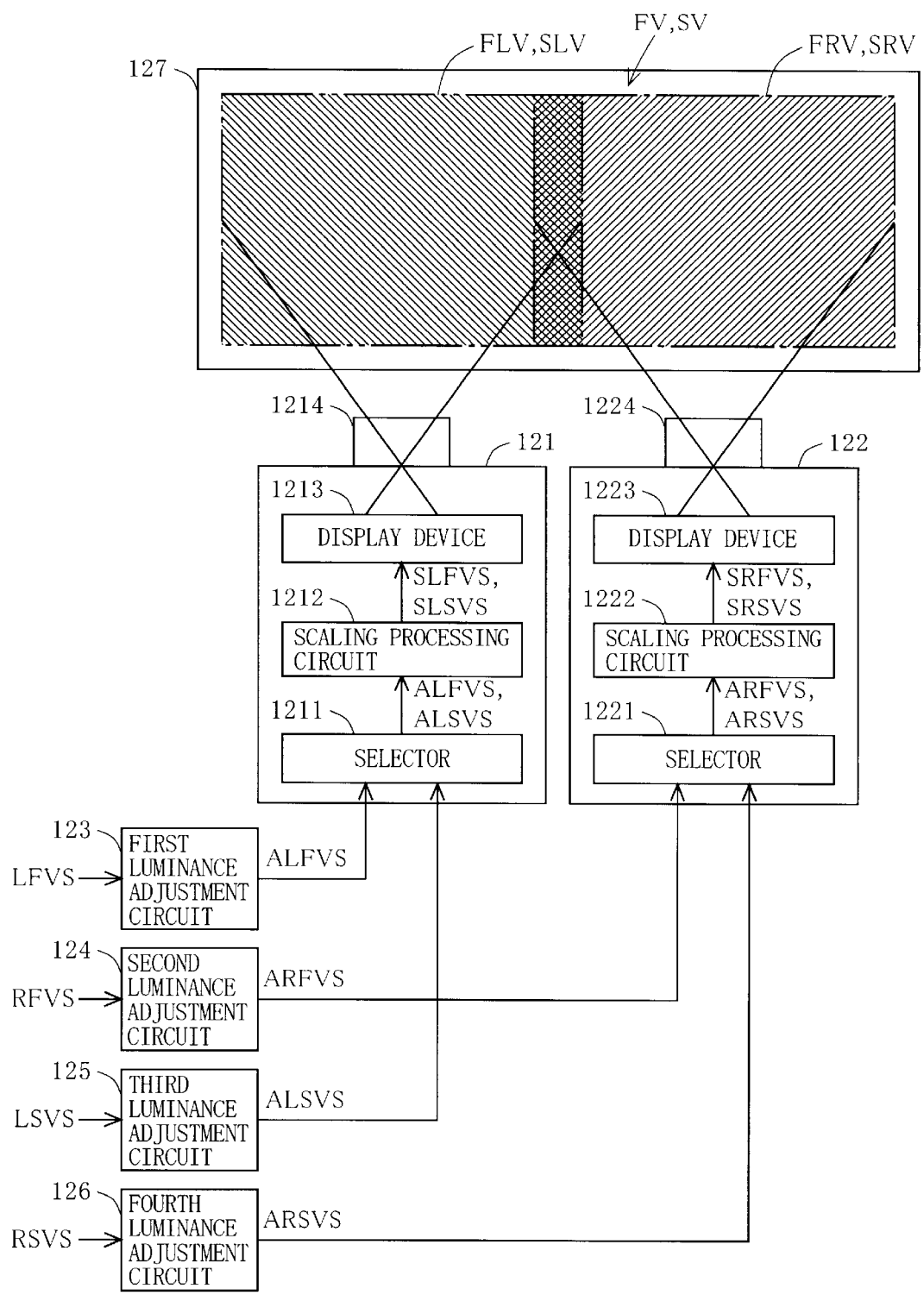
FIG. 12 is a block diagram illustrating a structure of a conventional video projecting system as well as its peripheral components.

Moreover, in accordance with the video projecting system $VP_1$, the aforementioned luminance adjustment circuits 13 and 23 are internalized within the video projectors 1 and 2. As a result, there is no need to provide luminance adjustment circuitry (such as the first to fourth luminance adjustment circuits 123 to 126 in FIG. 12) for each of a number of signal formats which the video projecting system $VP_1$ needs to support, which would have been a requirement in conventional structures. Thus, the overall system can be downsized and provided at lower costs.

Figure 5:
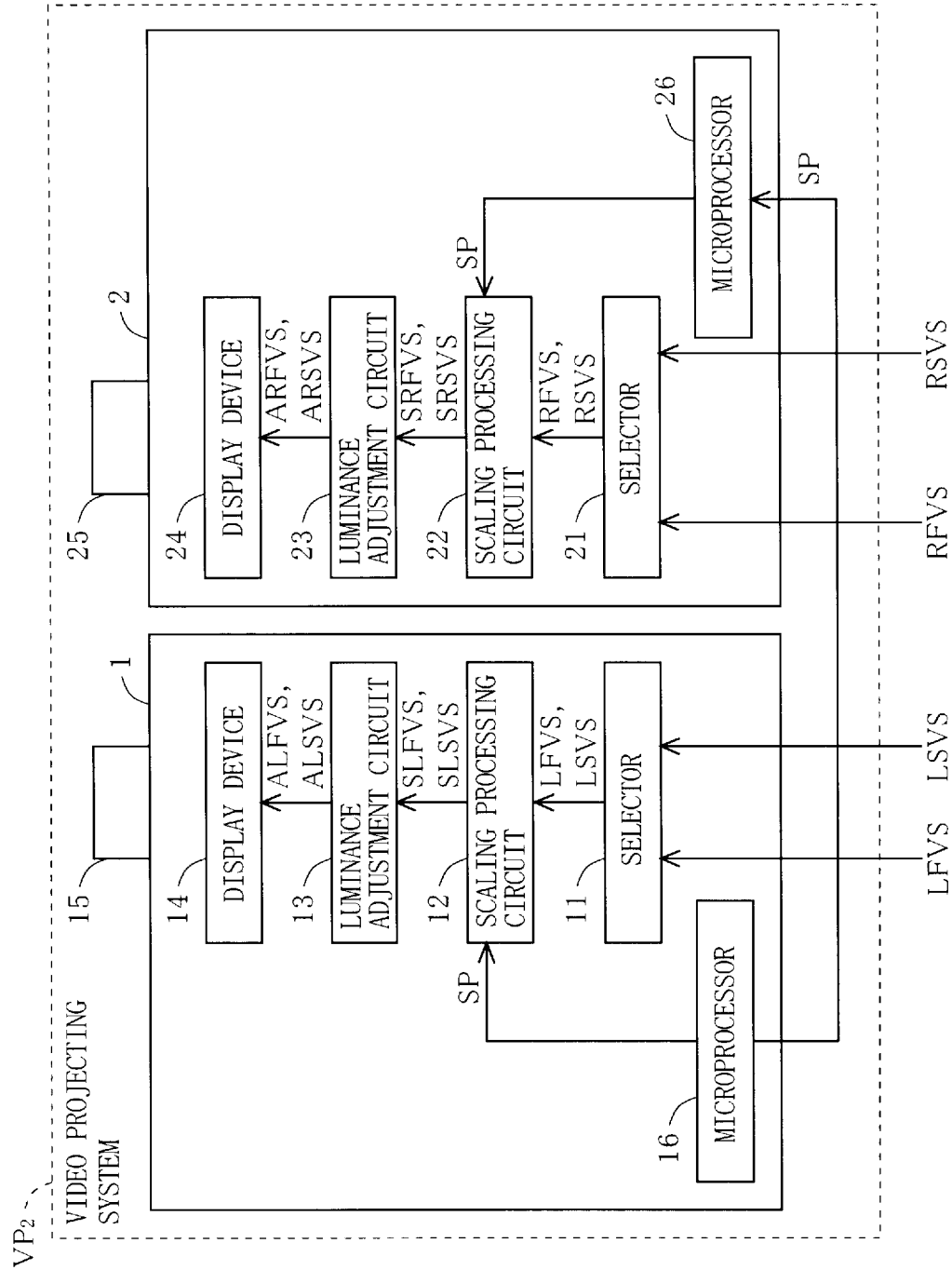
FIG. 5 is a block diagram illustrating an overall structure of a video projecting system $VP_2$ according to a second embodiment of the present invention.

FIG. 5 is a block diagram illustrating an overall structure of a video projecting system $VP_2$ according to a second embodiment of the present invention. The video projecting system $VP_2$ includes video projectors 1 and 2, as does the video projecting system $VP_1$. However, the video projectors 1 and 2 shown in FIG. 5 differ from the projectors 1 and 2 of the video projecting system $VP_1$ in that processors 16 and 26 are additionally comprised. Otherwise, the video projecting system $VP_2$ has an identical structure to that of the video projecting system $VP_1$. In FIG. 5, component elements which also appear in the structure shown in FIG. 1 are denoted by the same reference numerals as those used therein, and the descriptions thereof are omitted.

In FIG. 5, the video projectors 1 and 2 project a first image FV onto a screen (not shown) in such a manner that a first left partial image FLV and a first right partial image FSV partially overlap each other, as described with respect to the first embodiment.

At the beginning of or during the aforementioned projection, the processor 16 sets in the scaling processing circuit 12 a parameter SP which is necessary for the scaling process. Typical examples of the parameter SP include scaling ratios or display positions, as described with respect to the first embodiment. In accordance with the parameter SP which is set therein, the scaling processing circuit 12 applies a scaling process to a first video signal LFVS to generate and output a first scaled video signal SLFVS.

Furthermore, the processor 16 communicates with the processor 26 in the video projector 2 and transmits the same parameter SP that is currently set in the scaling processing circuit 12. The processor 26 sets the parameter SP, which is received from the processor 16, in the scaling processing circuit 22. As a result, the scaling processing circuit 22 can apply a scaling process to the first video signal RFVS by employing the same parameter SP as that used by the scaling processing circuit 12.

Figure 6A:
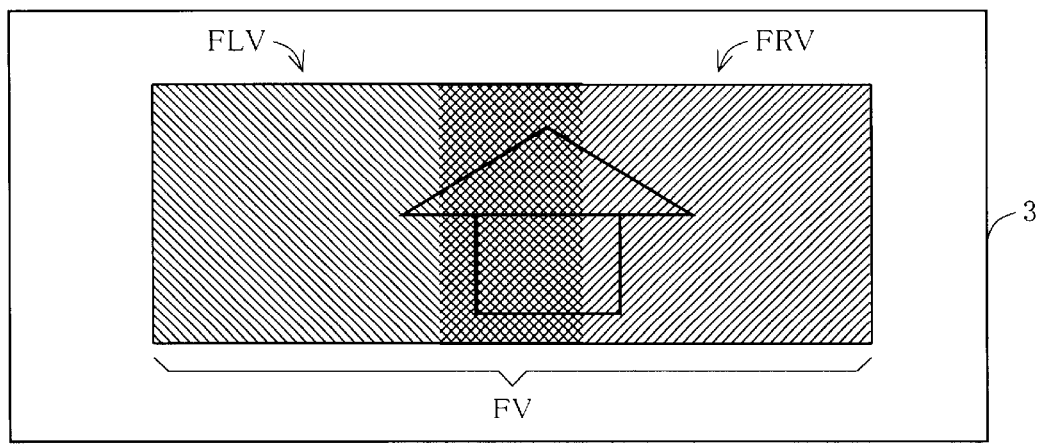
FIGS. 6A and 6B are schematic diagrams illustrating how a displayed image may be enlarged on the video projecting system $VP_2$ shown in FIG. 5.
Figure 6B:
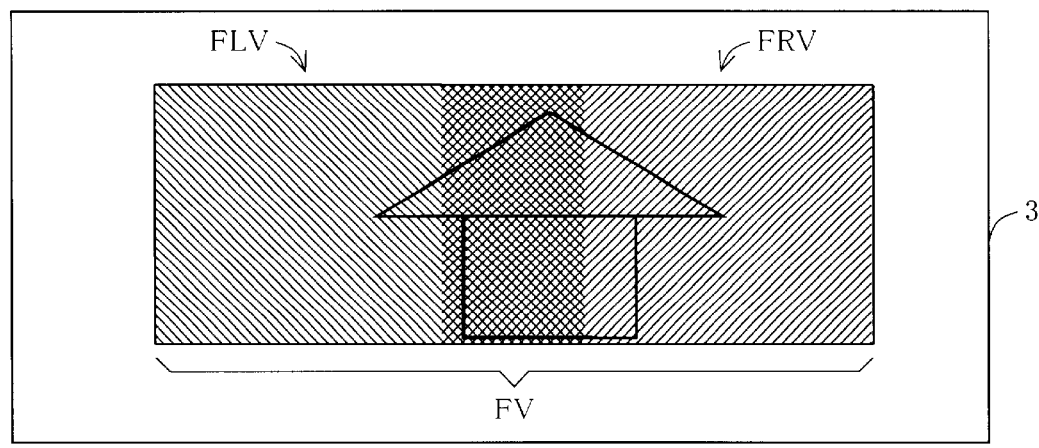

The above process can provide the following advantage, for example. If the video projecting system $VP_2$ externally receives a command which instructs that an image be enlarged while a first image FV as shown in FIG. 6A is being projected on the screen 3, then the scaling processing circuits 12 and 22 can modify the parameter SP substantially simultaneously. As a result, as shown in FIG. 6B, the video projectors 1 and 2 can substantially simultaneously project an enlarged first left partial image FLV and an enlarged right partial image FRL, respectively, on the screen 3.

As will be appreciated, in accordance with the video projecting system $VP_2$, due to the exchange of the parameter SP between the processors 16 and 26, the first left partial image FLV and the first right partial image FRL can be properly projected on the screen 3 always in the same size.

Figure 7:
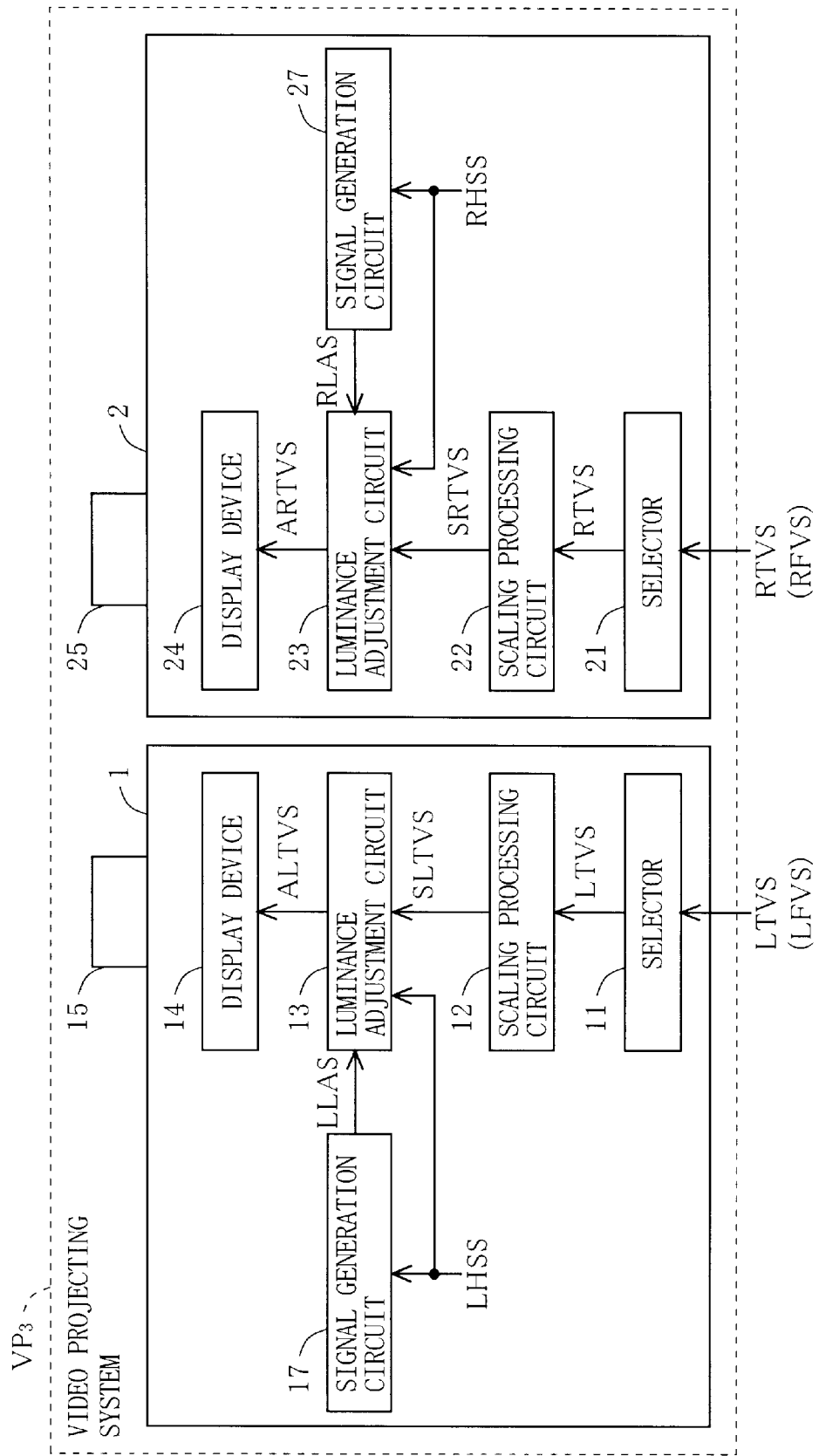
FIG. 7 is a block diagram illustrating an overall structure of a video projecting system $VP_3$ according to a third embodiment of the present invention.

FIG. 7 is a block diagram illustrating an overall structure of a video projecting system $VP_3$ according to a third embodiment of the present invention. The video projecting system $VP_3$ includes video projectors 1 and 2, as does the video projecting system $VP_1$. However, the video projectors 1 and 2 shown in FIG. 7 differ from the projectors 1 and 2 of the video projecting system $VP_1$ in that signal generation circuits 17 and 27 are additionally comprised. Otherwise, the video projecting system $VP_3$ has an identical structure to that of the video projecting system $VP_1$. In FIG. 7, component elements which also appear in the structure shown in FIG. 1 are denoted by the same reference numerals as those used therein, and the descriptions thereof are omitted.

In FIG. 7, the video projectors 1 and 2 project a first image FV onto a screen (not shown) in such a manner that a first left partial image FLV and a first right partial image FSV partially overlap each other, as described with respect to the first embodiment.

The present embodiment relates to a positioning adjustment which is to be performed prior to the actual image projection. As used herein, the "positioning adjustment" refers to the adjustment of the positions, etc., of the video projectors 1 and 2 which is performed based on visual inspection by a viewer in order to ensure that the first left overlapping region FLOA and the first right overlapping region FROA are positioned without a substantial misalignment along the horizontal and/or vertical direction.

During the positioning adjustment, left and right test video signals LTVS and RTVS for use in the positioning adjustment are inputted to the selectors 11 and 21. The test video signals LTVS and RTVS respectively represent a left test image LTV (see FIG. 9A) and a right test image RTV (see FIG. 9B). The test images LTV and RTV, which are left and right partial images of a test image TV, respectively, include a left overlapping region TLOA (see FIG. 9A) and a right overlapping region TROA (see FIG. 9B), similarly to the left overlapping region FLOA and the right overlapping region FROA illustrated in FIG. 2. Note that the test image TV may be a first image FV or a second image SV. The selectors 11 and 21 output the test video signals LTVS and RTVS to the scaling processing circuits 12 and 22.

The scaling processing circuits 12 and 22 subject incoming test video signals LTVS and RTVS to a scaling process which is similar to the aforementioned process which is performed for the first video signals LFVS and RFVS, thereby generating scaled test video signals SLTVS and SRTVS. The scaled test video signals SLTVS and SRTVS are outputted to the luminance adjustment circuits 13 and 23.

The signal generation circuits 17 and 27, which are in operation while the positioning adjustment is being performed by a viewer, receive horizontal synchronization signals LHSS and RHSS, which are used in the video projectors 1 and 2. The horizontal synchronization signals LHSS and RHSS are typically superimposed on the scaled test video signals SLTVS and SRTVS.

After the lapse of a predetermined period LT from the falling edge of the horizontal synchronization signal LHSS, the signal generation circuit 17 generates a luminance adjustment signal LLAS, which is outputted to the luminance adjustment circuit 13. The luminance adjustment signal LLAS specifies a pixel position at which a marker is to be displayed in the left overlapping region TLOA of the test image LTVS.

Figure 8A:
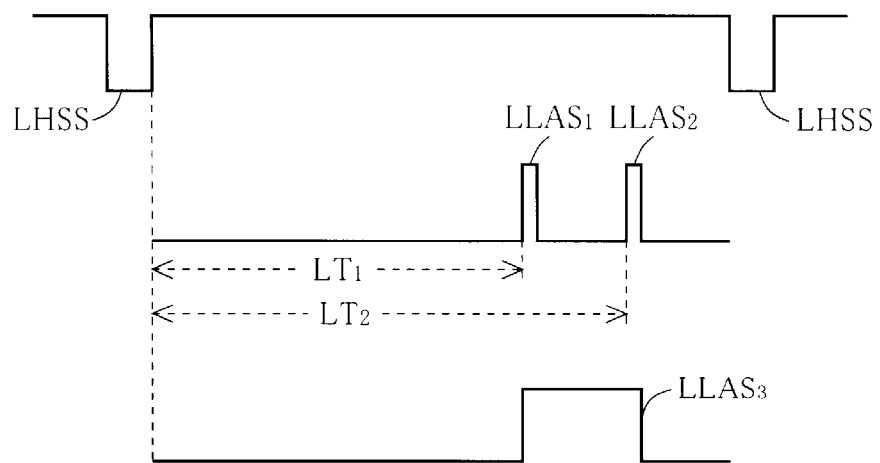
FIGS. 8A and 8B are diagrams illustrating respective luminance adjustment processes which are performed by luminance adjustment circuits 13 and 23 shown in FIG. 7.
Figure 8A:
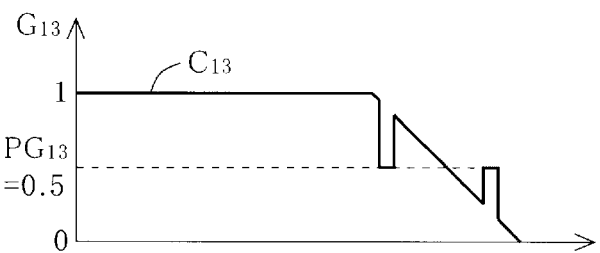

According to the present embodiment, as shown in the graph of FIG. 8A, luminance adjustment signals $LLAS_1$ and $LLAS_2$, each of which is at a Hi level, are outputted to the luminance adjustment circuit 13 at times $LT_1$ and $LT_2$, respectively, from the falling edge of the horizontal synchronization signal LHSS.

In addition, when a predetermined horizontal synchronization signal LHSS (defined below) is inputted, a luminance adjustment signal $LLAS_3$, which is at a Hi level, is outputted for a duration which corresponds to a period between the rising edge of the luminance adjustment signal $LLAS_1$ and the falling edge of the luminance adjustment signal $LLAS_2$. As used herein, a "predetermined horizontal synchronization signal LHSS" according to the embodiment means a horizontal synchronization signal LHSS which specifies a horizontal scanning line either near the upper edge, the center, or the lower edge of the left overlapping region TLOA.

After the lapse of a predetermined period RT from falling edge of the horizontal synchronization signal RHSS, the signal generation circuit 27 generates a luminance adjustment signal RLAS, which is outputted to the luminance adjustment circuit 23. The luminance adjustment signal RLAS specifies a pixel position at which a marker is to be displayed in the right overlapping region TROA of the test image RTVS. Note that the pixel which is specified by the luminance adjustment signal RLAS and the pixel which is specified by the luminance adjustment signal LLAS are "overlapping pixels" with respect to each other, i.e., they occupy the same position in the test image TV.

Figure 8B:
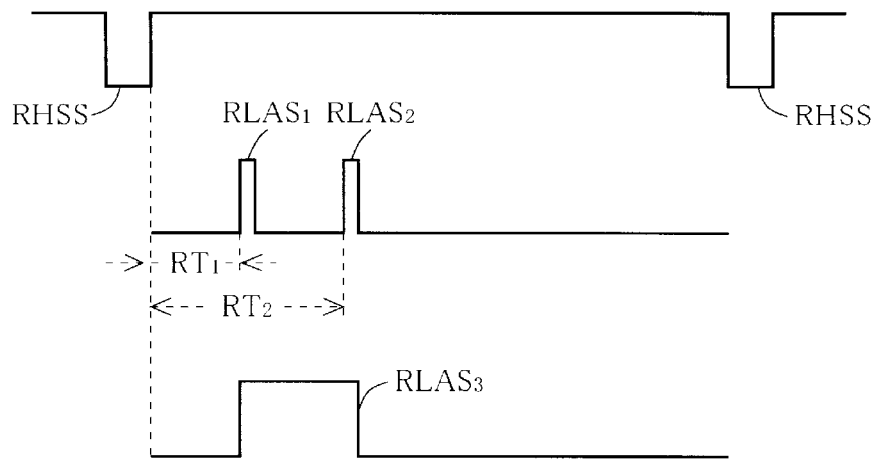
Figure 8B:
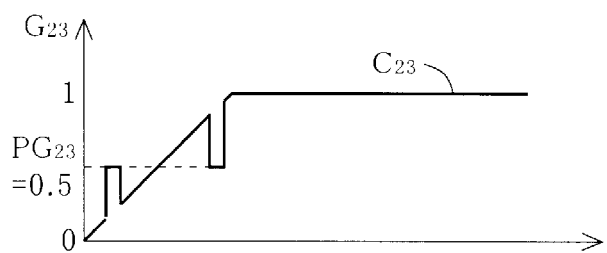

According to the present embodiment, as shown in the graph of FIG. 8B, luminance adjustment signals $RLAS_1$ and $RLAS_2$, each of which is at a Hi level, are outputted to the luminance adjustment circuit 23 at times $RT_1$ and $RT_2$, respectively, from the falling edge of the horizontal synchronization signal RHSS.

In addition, when a predetermined horizontal synchronization signal RHSS (defined below) is inputted, a luminance adjustment signal $RLAS_3$, which is at a Hi level, is outputted for a duration which corresponds to a period between the rising edge of the luminance adjustment signal $RLAS_1$ and the falling edge of the luminance adjustment signal $RLAS_2$. As used herein, a "predetermined horizontal synchronization signal RHSS" according to the embodiment means a horizontal synchronization signal RHSS which specifies a horizontal scanning line either near the upper edge, the center, or the lower edge of the right overlapping region TROA. In a given test image TV, the aforementioned "predetermined horizontal synchronization signal LHSS" and the "predetermined horizontal synchronization signal RHSS" specify the same horizontal scanning line.

The luminance adjustment circuit 13 receives the same horizontal synchronization signal LHSS that is inputted to the signal generation circuit 17. By referring to the incoming horizontal synchronization signal LHSS, the luminance adjustment circuit 13 sets the gain $G_{13}$ in accordance with the aforementioned gain characteristics $C_{13}$, and applies a luminance adjustment process to the scaled test video signal SLTVS received from the scaling processing circuit 12.

However, while the luminance adjustment signal LLAS is being inputted from the signal generation circuit 17, the gain $G_{13}$ of the luminance adjustment circuit 13 is set at a predetermined gain value $PG_{13}$ (see the graph of FIG. 8A), rather than at a value in accordance with the gain characteristics $C_{13}$. The gain value $PG_{13}$ is selected so that the resultant luminance allows a viewer to clearly recognize a marker by eyesight. According to the present embodiment, $PG_{13}$ is 0.5.

Thus, while the luminance adjustment signal LLAS is being inputted from the signal generation circuit 17, the luminance adjustment circuit 13 attenuates the luminance components of the pixels which are specified by the luminance adjustment signals LLAS (i.e., luminance adjustment signals $LLAS_1$ to $LLAS_3$ according to the present embodiment) in accordance with the prescribed gain $PG_{13}$. As a result, in the case where the luminance adjustment signals $LLAS_1$ and $LLAS_2$ are inputted, the gain characteristics $C_{13}$ as shown in the graph of FIG. 8A are obtained.

The luminance adjustment circuit 13 outputs the scaled test video signal SLTVS which has been subjected to the aforementioned luminance adjustment process to the display device 14 as an adjusted test video signal ALTVS.

By referring to the incoming horizontal synchronization signal RHSS, the luminance adjustment circuit 23 applies a luminance adjustment process to the scaled test video signal SRTVS, which has been received from the scaling processing circuit 22, in accordance with the aforementioned gain characteristics $C_{23}$.

However, while the luminance adjustment signal RLAS is being inputted from the signal generation circuit 27, the gain $G_{23}$ of the luminance adjustment circuit 23 is set at a predetermined gain value $PG_{23}$ (see the graph of FIG. 8B) . The gain value $PG_{23}$ is selected so that the resultant luminance allows a viewer to clearly recognize a marker by eyesight. According to the present embodiment, $PG_{23}$ is 0.5. Thus, while the luminance adjustment signal RLAS is being inputted from the signal generation circuit 27, the luminance adjustment circuit 23 attenuates the luminance components of the pixels which are specified by the luminance adjustment signals RLAS (i.e., luminance adjustment signals $RLAS_1$ to $RLAS_3$ according to the present embodiment) in accordance with the prescribed gain $PG_{23}$. As a result, in the case where the luminance adjustment signals $RLAS_1$ and $RLAS_2$ are inputted, the gain characteristics $C_{23}$ as shown in the graph of FIG. 8B are obtained.

The luminance adjustment circuit 23 outputs the scaled test video signal SRTVS which has been subjected to the aforementioned luminance adjustment process to the display device 24 as an adjusted test video signal ARTVS.

Figure 9A:
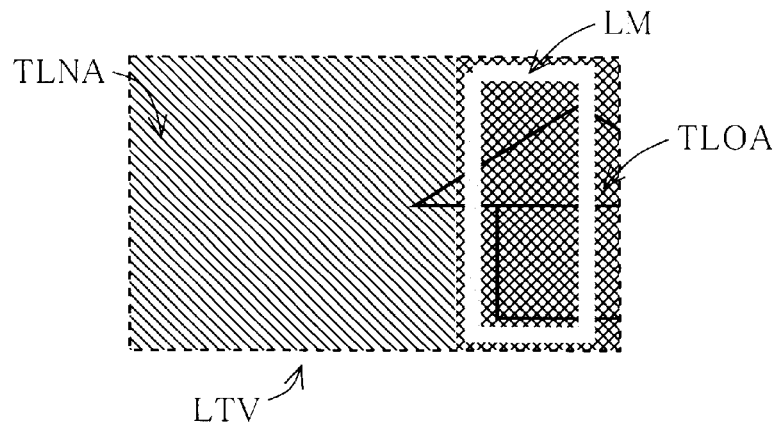
FIGS. 9A to 9C are schematic diagrams illustrating an exemplary test image TV which is to be projected by the video projecting system $VP_3$ shown in FIG. 7.

In accordance with the incoming adjusted test video signal ALTVS, the displays display device 14 displays the test image LTV as shown in FIG. 9A. The test image LTV is projected on the screen 3 via the optical system 15.

Figure 9B:
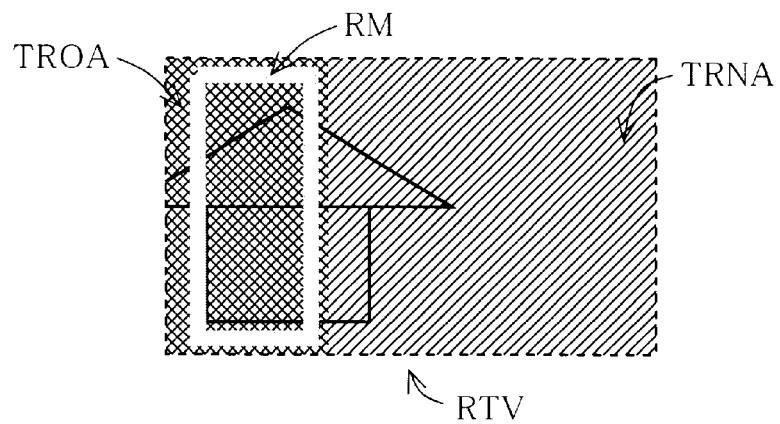

In accordance with the incoming adjusted video signal ARTVS, the display device 24 displays the test image RTV as shown in FIG. 9B. The test image RTV is projected on the screen 3 via the optical system 25.

In accordance with the gain characteristics $C_{13}$ shown in the graph of FIG. 8A, given that the left non-overlapping region TLNA has a luminance level of 1, the left overlapping region TLOA has a luminance level of 0.5 in the neighborhood of the outer periphery thereof. In accordance with the gain characteristics $C_{23}$ shown in the graph of FIG. 8B, the luminance level decreases to 0 toward the first reference line FRL, and increases to 1 toward the second reference line SRL, except in the outer periphery of the left overlapping region TLOA. Therefore, if the left overlapping region TLOA and the right overlapping region TROA are not properly aligned in the test image TV which is projected on the screen 3, the viewer will perceive a marker LM which is generated in the neighborhood of the outer periphery of the left overlapping region TLOA due to the aforementioned difference in luminance, and a marker RM which is generated in the neighborhood of the outer periphery of the right overlapping region TROA.

Figure 9C:
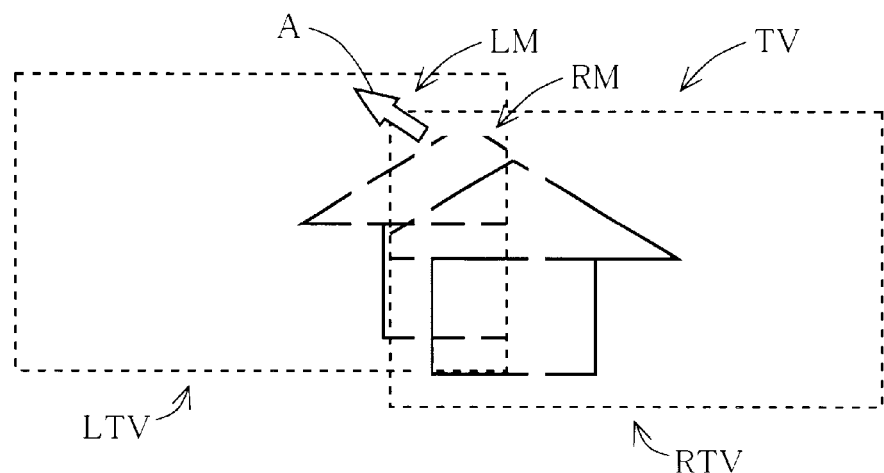

Then, the viewer may adjust the positions, etc., of the video projectors 1 and 2 so that the markers LM and RM will cancel each other and disappear. In this example, the viewer will adjust the relative positions of the test images LTV and RTV in a direction shown by arrow A in FIG. 9C. Thus, according to the embodiment, the viewer can easily correct for the misalignment between the test images LTV and RTV based on the markers LM and RM.

Figure 10:
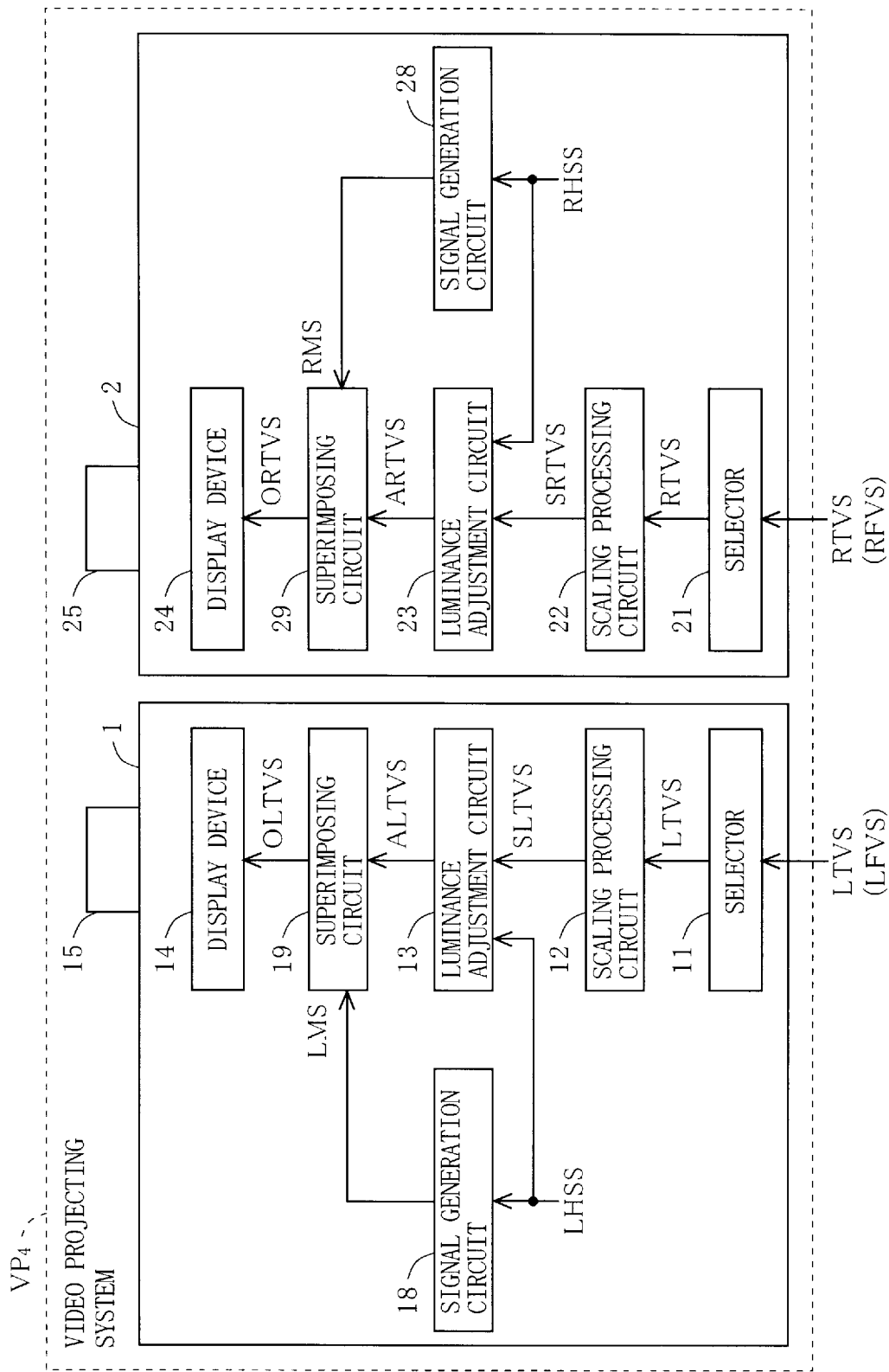
FIG. 10 is a block diagram illustrating an overall structure of a video projecting system $VP_4$ according to a fourth embodiment of the present invention.

FIG. 10 is a block diagram illustrating an overall structure of a video projecting system $VP_4$ according to a fourth embodiment of the present invention. The video projecting system $VP_4$ includes video projectors 1 and 2, as does the video projecting system $VP_1$. However, the video projectors 1 and 2 shown in FIG. 10 differ from the projectors 1 and 2 of the video projecting system VP1, in that signal generation circuits 18 and 28 and superimposing circuits 19 and 29 are additionally comprised. Otherwise, the video projecting system $VP_3$ has an identical structure to that of the video projecting system $VP_1$. In FIG. 10, component elements which also appear in the structure shown in FIG. 1 are denoted by the same reference numerals as those used therein, and the descriptions thereof are omitted.

In FIG. 10, the video projectors 1 and 2 perform processing for positioning adjustment in a manner similar to the third embodiment.

While positioning adjustment is being performed, the selectors 11 and 21 allow the incoming test video signals LTVS and RTVS to pass through to the scaling processing circuits 12 and 22, as in the third embodiment.

The scaling processing circuits 12 and 22 subject incoming test video signals LTVS and RTVS to a scaling process, thereby generating scaled test video signals SLTVS and SRTVS. The scaled test video signals SLTVS and SRTVS are outputted to the luminance adjustment circuits 13 and 23.

By referring to the incoming horizontal synchronization signal LHSS (described above), the luminance adjustment circuit 13 sets the gain $G_{13}$ in accordance with the aforementioned gain characteristics $C_{13}$, and applies a luminance adjustment process to the scaled test video signal SLTVS. The luminance adjustment circuit 13 outputs the scaled test video signal SLTVS which has been subjected to the aforementioned luminance adjustment process to the superimposing circuit 19 as an adjusted test video signal ALTVS.

By referring to the incoming horizontal synchronization signal RHSS (described above) , the luminance adjustment circuit 23 sets the gain $G_{23}$ in accordance with the aforementioned gain characteristics $C_{23}$, and applies a luminance adjustment process to the scaled test video signal SRTVS. The luminance adjustment circuit 23 outputs the scaled test video signal SRTVS which has been subjected to the aforementioned luminance adjustment process to the superimposing circuit 29 as an adjusted test video signal ARTVS.

The signal generation circuits 18 and 28, which are in operation while the positioning adjustment is being performed by a viewer, receive the aforementioned horizontal synchronization signals LHSS and RHSS.

By referring to the incoming horizontal synchronization signal LHSS, the signal generation circuit 18 generates a marker signal LMS, which is outputted to the superimposing circuit 19. The marker signal LMS represents a left marker image LMI to be displayed by the display device 14, and includes the luminance components and the chromatic components associated with the pixels contained therein. According to the present embodiment, the marker image LMI is previously generated so as to at least display a pixel at a predetermined position in a predetermined color or luminance in the test image LTV. According to the present embodiment, the "pixel at the predetermined position" is a pixel which is located in the neighborhood of the outer periphery of the left overlapping region TLOA. The predetermined color or luminance is selected so as to enable a viewer to clearly distinguish the marker image LMI from the test image LTV by eyesight.

By referring to the incoming horizontal synchronization signal RHSS, the signal generation circuit 28 generates a marker signal RMS, which is outputted to the superimposing circuit 29. The marker signal RMS represents a right marker image RMI to be displayed by the display device 24, and includes the luminance components and the chromatic components associated with the pixels contained therein. According to the present embodiment, the marker image RMI is previously generated so as to at least display a pixel at a predetermined position in a predetermined color or luminance in the test image RTV. According to the present embodiment, the "pixel at the predetermined position" is a pixel which is located in the neighborhood of the outer periphery of the right overlapping region TROA. The predetermined color or luminance is selected so as to enable a viewer to clearly distinguish the marker image RMI from the test image RTV by eyesight.

The superimposing circuit 19 receives the adjusted test video signal ALTVS and the marker signal LMS, which have been outputted by referring to the horizontal synchronization signal LHSS. The superimposing circuit 19 performs a synthesis process to superimpose the marker signal LMS on the incoming adjusted test video signal ALTVS. Thus, the superimposing circuit 19 generates a synthesized test video signal OLTVS representing the test image LTV having the marker image LMI superimposed thereon, which is outputted to the display device 14.

The superimposing circuit 29 receives the adjusted test video signal ARTVS and the marker signal RMS, which have been outputted by referring to the horizontal synchronization signal RHSS. The superimposing circuit 29 performs a synthesis process to superimpose the marker signal RMS on the incoming adjusted test video signal ARTVS. Thus, the superimposing circuit 29 generates a synthesized test video signal ORTVS representing the test image RTV having the marker image RMI superimposed thereon, which is outputted to the display device 24.

Figure 11A:
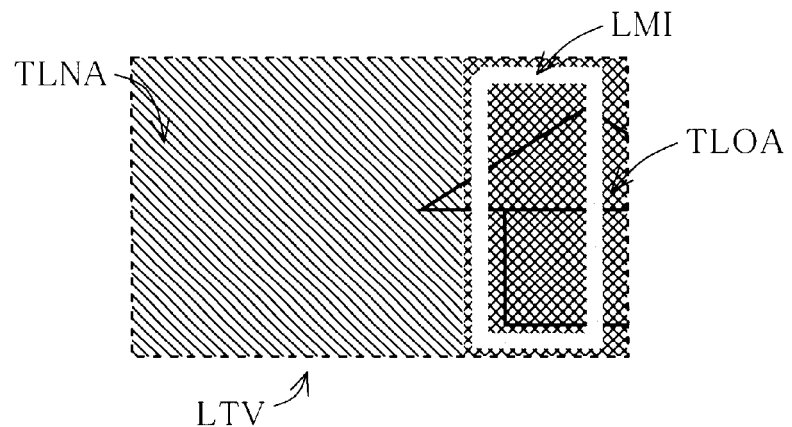
FIGS. 11A to 11C are schematic diagrams illustrating a method for correcting for a misalignment between projected images occurring in the video projecting system $VP_4$ shown in FIG. 10.

The display device 14 displays the test image LTV as shown in FIG. 11A in accordance with the synthesized test video signal OLTVS. The test image LTV is projected on the screen 3 via the optical system 15.

Figure 11B:
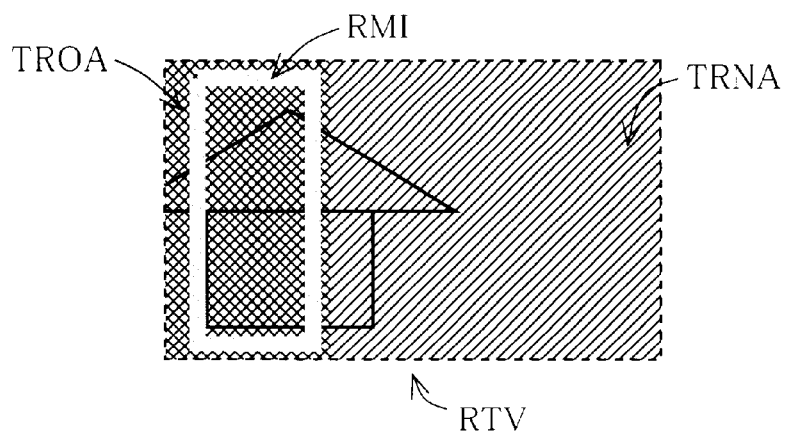

The display device 24 displays the test image RTV as shown in FIG. 11B in accordance with the synthesized test video signal ORTVS. The test image RTV is projected on the screen 3 via the optical system 25.

Figure 11C:
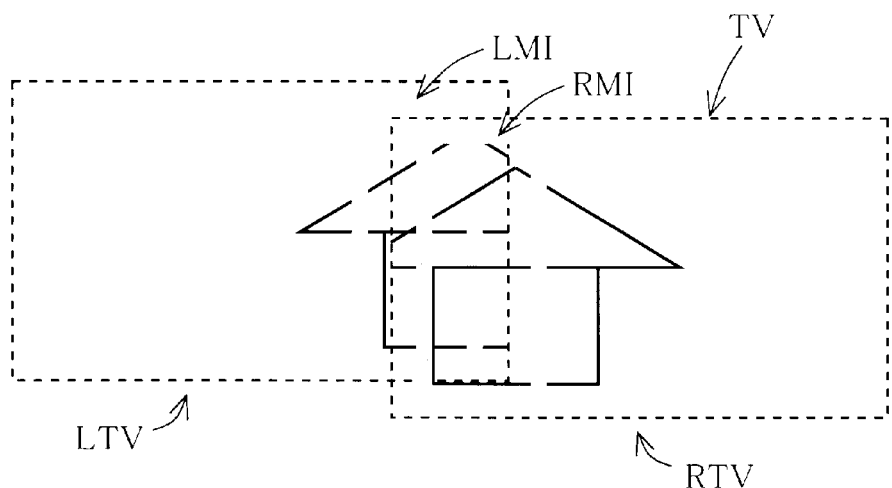

Thus, the marker image LMI is superimposed at the predetermined position in the test image LTV, and the marker image RMI is superimposed at the predetermined position in the test image RTV. Therefore, if the left overlapping region TLOA and the right overlapping region TROA are not properly aligned in the test image TV which is projected on the screen 3, the viewer will perceive the misaligned markers LMI and RMI, as shown in FIG. 11C.

Then, the viewer may adjust the positions, etc., of the video projectors 1 and 2 so that the marker images LMI and RMI will overlap each other, thereby correcting the relative positions of the test images LTV and RTV. Thus, according to the embodiment, the viewer can easily correct for the misalignment between the test images LTV and RTV based on the marker images LMI and RMI.

The above-described embodiments are directed to practical implementations in which the video projectors 1 and 2 are disposed side by side along the horizontal direction. Alternatively, the video projectors 1 and 2 may be disposed one on top of the other, i.e., along the vertical direction, so that a viewer can observe "portrait" (i.e., having greater vertical height than horizontal length) images. The inventive concepts which have been illustrated with respect to the above embodiments can be readily applied to such implementations as well.

Although the above-described embodiments illustrate video projecting systems $VP_1$ to $VP_4$ comprising two video projectors 1 and 2, three or more video projectors may be comprised. The inventive concepts which have been illustrated with respect to the above embodiments can be readily applied to such implementations as well.

The above-described embodiments illustrate preferable structures in which the selectors 11 and 21 are internalized within the video projectors 1 and 2, respectively. Alternatively, the selectors 11 and 21 may be omitted from the video projectors 1 and 2, and the video signal LFVS or LSVS may be directly inputted to the scaling processing circuit 12, and the video signal RFVS or RSVS may be directly inputted to the scaling processing circuit 22.

The inventive concepts which have been illustrated with respect to the above embodiments can be applied to video projecting systems of a so-called front type, in which a viewer observes an image reflected from a screen, and video projecting systems of a so-called rear type, in which a viewer observes an image transmitted through a screen.

While the invention has been described in detail, the foregoing description is in all aspects illustrative and not restrictive. It is understood that numerous other modifications and variations can be devised without departing from the scope of the invention.

What is claimed is:

1. A video projecting system for generating a stitched image from projected partial images, the video projecting system comprising a plurality of video projectors, wherein each of said plurality of video projectors comprises:
    a selector for selecting one of a plurality of externally inputted video signals, said selector outputting the selected externally inputted video signal;
    a scaling processing circuit for applying a scaling process to the selected externally inputted video signal outputted from said selector to generate a scaled video signal representing a partial image of a predetermined size;

a luminance adjustment circuit for applying a luminance adjustment process to the scaled video signal outputted from said scaling processing circuit to generate an adjusted video signal representing the partial image having a reduced luminance in a predetermined region of the partial image;

a display device for generating the partial image based on the adjusted video signal outputted from said luminance adjustment circuit; and an optical system for projecting the partial image generated by said display device, wherein the partial images projected by said respective optical systems partially overlap each other to create the stitched image, wherein the predetermined regions are a region in which the respective partial images overlap each other, and wherein said scaling processing circuit is connected after said selector and before said luminance adjustment circuit.

2. The video projecting system according to claim 1, wherein said plurality of video projectors are two video projectors.

3. The video projecting system according to claim 2, wherein one of said luminance adjustment circuits attenuates a luminance component in one of the scaled video signals with a first gain, and the other of said luminance adjustment circuits attenuates a luminance component in the other of the scaled video signals with a second gain, the first and second gains are set to x, where x is a positive number, when processing the luminance components within a region in which the two partial images do not overlap each other, and the first and second gains are set so that a sum of the first and second gains equals x when processing the luminance components within the region in which the two partial images overlap each other.

4. A video projecting system for generating a stitched image from projected partial images, the video projecting system comprising a plurality of video projectors, wherein each of said plurality of video projectors comprises:

a scaling processing circuit for applying a scaling process to an incoming video signal to generate a scaled video signal representing a partial image of a predetermined size;

a luminance adjustment circuit for applying a luminance adjustment process to the scaled video signal outputted from said scaling processing circuit to generate an adjusted video signal representing the partial image having a reduced luminance in a predetermined region of the partial image;

a display device for generating the partial image based on the adjusted video signal outputted from said luminance adjustment circuit; and an optical system for projecting the partial image generated by said display device, wherein the partial images projected by the respective optical systems partially overlap each other to create the stitched image, wherein the predetermined regions are a region in which the respective partial images overlap each other, wherein each of said plurality of video projectors further comprises a microprocessor capable of transferring a parameter, which is used by said scaling processing circuit in said respective video projector to be received by another of said microprocessors of said plurality of video projectors, and said another microprocessor receiving the parameter sets the parameter to said scaling processing circuit of said respective video projector of said another processor, whereby a plurality of said scaling processing circuits are able to perform the scaling processes using the same parameter.

5. A video projecting system for generating a stitched image from projected partial images, the video projecting system comprising a plurality of video projectors, wherein each of said plurality of video projectors comprises:

a scaling processing circuit for applying a scaling process to an incoming video signal to generate a scaled video signal representing a partial image of a predetermined size;

a luminance adjustment circuit for applying a luminance adjustment process to the scaled video signal outputted from said scaling processing circuit to generate an adjusted video signal representing the partial image having a reduced luminance in a predetermined region of the partial image;

a display device for generating the partial image based on the adjusted video signal outputted from said luminance adjustment circuit; and an optical system for projecting the partial image generated by said display device, wherein the partial images projected by said respective optical systems partially overlap each other to create the stitched image, wherein the predetermined regions are a region in which the respective partial images overlap each other, wherein each of said plurality of video projectors comprises a signal generation circuit which is in operation while a viewer performs a positioning adjustment for the partial images, said signal generation circuit generates a luminance adjustment signal by referring to a horizontal synchronization signal associated with the incoming video signal, and outputs the luminance adjustment signal to said respective luminance adjustment circuit in said respective video projector which comprises said respective signal generation circuit, and each of said luminance adjustment circuits performs the luminance adjustment process in accordance with the luminance adjustment signal received from said respective signal generation circuit, and generates the adjusted video signal including a marker which is displayed at a predetermined position in the respective partial image, the marker being used for the positioning adjustment.

6. The video projecting system according to claim 5, wherein each of the partial images contains an overlapping pixel in the region in which any two of the partial images overlap each other, the respective overlapping pixels in the overlapping partial images occupying the same position in the stitched images, and the adjusted video signal generated by each of said luminance adjustment circuits is a signal for displaying the marker at the position occupied by the overlapping pixel in the stitched image.

7. A video projecting system for generating a stitched image from projected partial images, the video projecting system comprising a plurality of video projectors, wherein each of said plurality of video projectors comprises:

a scaling processing circuit for applying a scaling process to an incoming video signal to generate a scaled video signal representing a partial image of a predetermined size;

a luminance adjustment circuit for applying a luminance adjustment process to the scaled video signal outputted from said scaling processing circuit to generate an adjusted video signal representing the partial image having a reduced luminance in a predetermined region of the partial image;

a display device for generating the partial image based on the adjusted video signal outputted from said luminance adjustment circuit; and an optical system for projecting the partial image generated by said display device, wherein the partial images projected by said respective optical systems partially overlap each other to create the stitched image, wherein the predetermined regions are a region in which the respective partial images overlap each other, wherein each of said plurality of video projectors further comprises:

a signal generation circuit which is in operation while a viewer performs a positioning adjustment for the overlapping partial images to generate a marker signal representing a marker; and a superimposing circuit for performing a synthesis process for the marker signal generated by said signal generation circuit and the adjusted video signal outputted from said respective luminance adjustment circuit to generate a synthesized video signal in which the marker is superimposed on the partial image, and outputting the synthesized video signal to said respective display device.

8. The video projecting system according to claim 7, wherein each of the partial images contains an overlapping pixel in the region in which any two partial images overlap each other, the respective overlapping pixels in the overlapping partial images occupying the same position in the stitched image, and the marker signal is a signal for displaying the superimposed marker at the overlapping pixel in the respective partial image.

9. A method for projecting an image which is carried out by a plurality of video projectors for generating a stitched image from partial images which are projected by a plurality of video projectors, the method comprising:

selecting one of a plurality of externally inputted video signals, and allowing the selected externally inputted video signal to be outputted;

applying a scaling process to the selected externally inputted signal outputted by said selecting operation, after said selecting operation, to generate a scaled video signal representing a partial image of a predetermined size;

applying a luminance adjustment process to the scaled video signal from the scaling process, after said applying of the scaling process, to generate an adjusted video signal representing the partial image having a reduced luminance in a predetermined region of the partial image;

generating the partial image based on the adjusted video signal which results from said applying of the luminance adjustment process; and projecting the partial image generated by said generation of the partial image, wherein the partial images projected by said respective projecting operations partially overlap each other to create the stitched image, and wherein the predetermined regions are a region in which the respective partial images overlap each other.

10. A video projector for generating a stitched image, the video projector comprising:

a selector for selecting one of a plurality of externally inputted video signals, said selector allowing the selected externally inputted video signal;

a scaling processing circuit for applying a scaling process to the selected externally inputted video signal outputted from said selector to generate a scaled video signal representing a partial image of a predetermined size;

a luminance adjustment circuit for applying a luminance adjustment process to the scaled video signal outputted from said scaling processing circuit to generate an adjusted video signal representing the partial image having a reduced luminance in a predetermined region of the partial image;

a display device for generating the partial image based on the adjusted video signal outputted from said luminance adjustment circuit;

an optical system for projecting the partial image generated by said display device; and a communication circuit for communicating with another like video projector, parameters for synchronizing scaling and luminance for the stitched image, wherein the partial image projected by said optical system and a partial image having a predetermined region projected by another optical system of the another like video projector partially overlap each other to create the stitched image, and wherein the predetermined regions are a region in which the respective partial images overlap each other.

* * * * *